(12) United States Patent
Shakhnovich

(10) Patent No.: US 7,691,197 B2
(45) Date of Patent: Apr. 6, 2010

(54) METHOD OF PREPARING YELLOW PIGMENTS

(75) Inventor: Alexander I. Shakhnovich, Westford, MA (US)

(73) Assignee: Cabot Corporation, Boston, MA (US)

( * ) Notice: Subject to any disclaimer, the term of this patent is extended or adjusted under 35 U.S.C. 154(b) by 653 days.

(21) Appl. No.: 11/584,108

(22) Filed: Oct. 20, 2006

(65) Prior Publication Data

US 2007/0089641 A1    Apr. 26, 2007

Related U.S. Application Data

(60) Provisional application No. 60/729,349, filed on Oct. 21, 2005.

(51) Int. Cl.
- C09B 67/20 (2006.01)
- C07D 273/00 (2006.01)
- C07D 273/08 (2006.01)
- C08K 5/1545 (2006.01)

(52) U.S. Cl. .................. 106/498; 106/493; 544/63; 544/74; 546/49

(58) Field of Classification Search .............. 106/498, 106/193; 544/63, 74; 546/49
See application file for complete search history.

(56) References Cited

U.S. PATENT DOCUMENTS

| | | | |
|---|---|---|---|
| 3,334,102 | A | 8/1967 | Aldridge et al. |
| 4,142,890 | A | 3/1979 | Bloom et al. |
| 4,946,509 | A | 8/1990 | Schwartz et al. |
| 5,837,045 | A | 11/1998 | Johnson et al. |
| 5,851,280 | A | 12/1998 | Belmont et al. |
| 5,922,118 | A | 7/1999 | Johnson et al. |
| 6,472,471 | B2 | 10/2002 | Cooke et al. |
| 6,494,943 | B1 | 12/2002 | Yu et al. |
| 6,506,245 | B1 | 1/2003 | Kinney et al. |
| 6,641,653 | B2 | 11/2003 | Yu |
| 6,896,726 | B2 | 5/2005 | Bugnon et al. |
| 6,936,097 | B2 | 8/2005 | Shakhnovich |
| 6,942,724 | B2 | 9/2005 | Yu |
| 7,223,302 | B2 | 5/2007 | Shakhnovich |
| 7,307,170 | B2 | 12/2007 | Kaul et al. |
| 2006/0217458 | A1 | 9/2006 | Shakhnovich |
| 2007/0089641 | A1* | 4/2007 | Shakhnovich ............ 106/31.77 |
| 2007/0277699 | A1 | 12/2007 | Bauer |

FOREIGN PATENT DOCUMENTS

| | | |
|---|---|---|
| JP | 07-041689 | 2/1995 |
| JP | 10-017783 | 5/1998 |
| JP | 10-130554 | 5/1998 |
| JP | 11-080576 | 5/1998 |
| JP | 11-130972 | 5/1998 |
| JP | 2005-041971 | 2/2005 |
| WO | WO 97/48769 A2 | 5/1997 |
| WO | WO 00/52102 | 9/2000 |
| WO | WO 01/30918 | 5/2001 |
| WO | WO 02/094944 | 11/2002 |

OTHER PUBLICATIONS

E.E. Jaffe; H. Matrick: "Synthesis of Epindolidione" Journal of Organic Chemistry, vol. 33, No. 11, Nov. 1968, pp. 4004-4010.
C.K. Kim; C. A. Maggiulli: "A New Synthesis of Dibenzo[b,g][1,5]naphthyridine-6,12(5H,11H)dione (Epindolidione)" Journal of Heterocyclic Chemistry, vol. 16, 1979, pp. 1651-1653.
International Search Report and Written Opinion for PCT/2006/041126, mailed Oct. 26, 2007.
International Preliminary Report on Patentability for PCT/2006/041126, mailed May 2, 2008.
JP11-184157 to Toyo Ink Mfg. Co. Ltd. Publication Date Jul. 9, 1999 Abstract Only (from Patent Abstracts of Japan).
JP11-184158 to Toyo Ink Mfg. Co. Ltd. Publication Date Jul. 9, 1999 Abstract Only (from Patent Abstracts of Japan).
JP11-184159 to Toyo Ink Mfg. Co. Ltd. Publication Date Jul. 9, 1999 Abstract Only (from Patent Abstracts of Japan).
JP11-184160 to Toyo Ink Mfg. Co. Ltd. Publication Date Jul. 9, 1999 Abstract Only (from Patent Abstracts of Japan).
JP11-184161 to Toyo Ink Mfg. Co. Ltd. Publication Date Jul. 9, 1999 Abstract Only (from Patent Abstracts of Japan).
JP11-184162 to Toyo Ink Mfg. Co. Ltd. Publication Date Jul. 9, 1999 Abstract Only (from Patent Abstracts of Japan).

* cited by examiner

*Primary Examiner*—Anthony J Green

(57) ABSTRACT

The present invention relates to a method of preparing a yellow pigment comprising an asymmetric quinolonoquinolone in an amount greater than 50% by weight of the yellow pigment. Also disclosed are modified yellow pigments comprising this yellow pigment having attached at least one organic group as well as inkjet ink compositions comprising the yellow pigments or the modified yellow pigments.

18 Claims, No Drawings

METHOD OF PREPARING YELLOW PIGMENTS

CROSS-REFERENCE TO RELATED APPLICATIONS

This patent application claims the benefit of U.S. Provisional Patent Application No. 60/729,349, filed Oct. 21, 2005.

BACKGROUND OF THE INVENTION

1. Field of the Invention

The present invention relates to a yellow pigment comprising an asymmetric quinolonoquinolone, methods of preparing this yellow pigment, and inkjet ink compositions comprising them.

2. Description of the Related Art

An inkjet ink composition generally consists of a vehicle, which functions as a carrier, and a colorant such as a dye or pigment. Additives and/or cosolvents can also be incorporated in order to adjust the inkjet ink to attain the desired overall performance properties.

Inkjet ink compositions comprising a yellow pigment has been an area of particular focus for inkjet ink manufacturers. There has been a need in the industry for an inkjet ink composition comprising a yellow pigment having excellent lightfastness and the proper balance of color strength and hue, along with good overall dispersion stability. Various classes of yellow pigments have been prepared, each with varying degrees of lightfastness and color. For example, U.S. Pat. No. 3,334,102 describes the preparation of quinolonoquinolones, which are described as having good lightfastness. Various substituted quinolonoquinolones have also been prepared. For example, JP 11-130972 and 10-017783 describe the preparation of halogenated quinolonoquinolones.

In general, pigments alone, including yellow pigments, are not readily dispersible in liquid vehicles. A variety of techniques have been developed which can provide stable pigment dispersions that can be used in inkjet printing. For example, dispersants can be added to the pigment to improve its dispersibility in a particular medium. Examples of dispersants include water-soluble polymers and surfactants. Typically, these polymeric dispersants have a molecular weight less than 20,000 in order to maintain solubility and therefore pigment stability. Yellow pigment dispersions have also been prepared using this technique. For example, JP 10-130554 describes inkjet ink compositions comprising substituted quinolonoquinolones which further comprise a rosin, resin, surfactant, or dispersant.

The surface of pigments contain a variety of different functional groups, and the types of groups present depend on the specific class of pigment. Several methods have been developed for grafting materials and, in particular, polymers to the surface of these pigments. For example, it has been shown that polymers can be attached to carbon blacks containing surface groups such as phenols and carboxyl groups. However, methods which rely on the inherent functionality of a pigment's surface cannot be applied generally because not all pigments have the same specific functional groups.

Methods for the preparation of modified pigment products, including modified yellow pigments, have also been developed. These methods can be used to produce pigments with a variety of different attached functional groups. For example, U.S. Pat. No. 5,851,280 discloses methods for the attachment of organic groups onto pigments including, for example, attachment via a diazonium reaction wherein the organic group is part of the diazonium salt. Other methods to prepare modified pigments have also been described, including PCT Publication No. WO 01/51566, which discloses methods of making a modified pigment by reacting a first chemical group and a second chemical group to form a pigment having attached a third chemical group. Ink compositions, including inkjet inks, containing these pigments are also described.

While these methods provide modified pigments, including modified yellow pigments, having attached groups, there remains a need in the industry for an inkjet ink composition comprising a yellow pigment having excellent lightfastness, the proper balance of color strength, and/or hue along with good dispersion stability.

SUMMARY OF THE INVENTION

The present invention relates to a method of preparing a yellow pigment comprising an asymmetric quinolonoquinolone in an amount greater than 50% by weight of the yellow pigment. The method comprises the step of combining, in any order, i) a reagent having the formula $$A_n Ar\text{—}NH\text{—}CH(COX)\text{—}CO\text{—}COY \qquad (I),$$

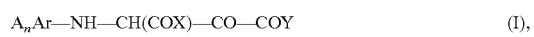

ii) an aniline compound having the formula $$B_n Ar\text{—}NH_2 \qquad (II),$$

and iii) a solvent to form a mixture comprising an asymmetric derivative having the formula $$A_n Ar\text{—}NH(COX')C\!=\!C(COY')NH\text{—}ArB_n \qquad (III).$$

The mixture is converted to the yellow pigment.

The present invention further relates to a method of preparing a mixture of (2,3-bis-substituted anilino)-but-2-ene-1,4-dioc acid derivatives. The method comprises the step of combining, in any order, i) a reagent having the formula $$A_n Ar\text{—}NH\text{—}CH(COX)\text{—}CO\text{—}COY \qquad (I),$$

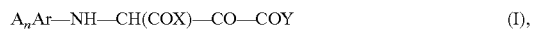

ii) an aniline compound having the formula $$B_n Ar\text{—}NH_2 \qquad (II),$$

and iii) a solvent to form the mixture of (2,3-bis-substituted anilino)-but-2-ene-1,4-dioic acid derivatives, which comprises an asymmetric derivative having the formula $$A_n Ar\text{—}NH(COX')C\!=\!C(COY')NH\text{—}ArB_n \qquad (III)$$

in an amount greater than 50% by weight of the mixture.

The present invention further relates to a method of preparing a yellow pigment comprising an asymmetric quinolonoquinolone in an amount greater than 50% by weight of the yellow pigment. The method comprises the step of converting a mixture of (2,3-bis-substituted anilino)-but-2-ene-1,4-dioic acid derivatives comprising an asymmetric derivative having the formula $$A_n Ar\text{—}NH(COX')C\!=\!C(COY')NH\text{—}ArB_n \qquad (III);$$

to the yellow pigment.

The present invention further relates to a yellow pigment comprising at least one asymmetric quinolonoquinolone in an amount greater than 50% by weight of the yellow pigment as well as to ink compositions, such as inkjet ink compositions, and coating compositions comprising the yellow pigment. The present invention further relates to a modified yellow pigment comprising the yellow pigment having attached at least one organic group as well as to ink compositions, such as inkjet ink compositions, and coating compositions comprising the modified yellow pigment.

It is to be understood that both the foregoing general description and the following detailed description are exemplary and explanatory only and are intended to provide further explanation of the present invention, as claimed.

DETAILED DESCRIPTION OF THE INVENTION

The present invention relates to yellow pigments and methods of preparing yellow pigments, as well as to inkjet ink compositions comprising them.

The method of the present invention comprises the steps of combining, in any order, a reagent having the formula $A_nAr$—NH—CH(COX)—CO—COY, an aniline compound having the formula $B_nAr$—$NH_2$, and a solvent to form a mixture comprising an asymmetric derivative having the formula $A_nAr$—NH(COX')C=C(COY')NH—$ArB_n$; and converting the mixture to the yellow pigment. Each of these components will be discussed in more detail below.

The reagent used in the method of the present invention is a material having the formula

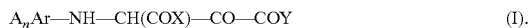

$A_nAr$—NH—CH(COX)—CO—COY            (I).

In formula I, Ar is an aromatic group, such as a phenyl group, which may be substituted with at least one group, A. Thus, n, the number of substituents A, is 0-4, and is preferably 0, 1, or 2. A is a substituent on the aromatic group and can be the same or different when n is greater than 1. Examples of substituents A include, but are not limited to, alkyl groups (such as a methyl, ethyl, propyl, butyl, pentyl, or hexyl group), alkoxy groups (such as methoxy or ethoxy groups), and halogens. Preferably, A is a Cl, F, or methyl group. X and Y, which can be the same or different, represent —OH, —$O^-M^+$, —OR, —NHR, or —$NR_2$, wherein $M^+$ is a metal ion (such as $Na^+$, $K^+$, $Li^+$), and R is independently a C1-C6 alkyl group (such as a methyl, ethyl, or butyl group). Thus, COX and COY represent carboxylic acid groups, carboxylic acid salt groups, ester groups, or amide groups. Preferably, X and Y are —OR, such as methoxy or ethoxy groups, and COX and COY represent alkyl ester groups.

The reagent having formula I can be prepared by a variety of different methods. For example, an N-phenyl glycine ester derivative, $A_nAr$—NH—$CH_2$COX, can be combined with a dialkyl oxylate, YCO—COY, under alkaline conditions to produce this reagent. Other methods can also be used and will be known to one skilled in the art.

The aniline compound used in the method of the present invention is a material having the formula

$B_nAr$—$NH_2$            (II).

In formula II, Ar and n are as described above. B is a substitutent on the aromatic group and can be the same or different when n is greater than 1. B can be any of the substituent described for A above. Furthermore, $B_nAr$ and $A_nAr$ are different. Thus, the aromatic group of the reagent and the aromatic group of the aniline compound are not the same. In this way, a mixture is formed comprising an asymmetric derivative, which is described in more detail below. For example, the aniline compound may be a substituted aniline, such as a fluoroaniline, while the aromatic group of the reagent may be unsubstituted. Alternatively, the aniline compound may be an unsubstituted aniline (i.e., aniline) and the aromatic group of the reagent may comprise one or more substituents. Also, both the aromatic group of the aniline compound and the aromatic group of the reagent may be substituted aromatic groups comprising substituents that differ in number, type, and/or position on the aromatic group.

The solvent used in the method of the present invention can be any liquid that allows for the reagent and the aniline compound to be conveniently combined. Preferably, the reagent, the aniline compound, or both are soluble in the solvent. For example, the solvent may be a medium comprising at least one alcohol, such as ethanol and methanol. Preferably the solvent is not water. The solvent may further comprise a catalytic amount (i.e., less than stoichiometric) of acid, such as sulfuric acid, nitric acid, or hydrochloric acid.

For the method of the present invention, the reagent, the aniline compound, and the solvent can be combined in any order. For example, the reagent may be dissolved in the solvent, and the aniline compound added to the resulting solution. Furthermore, the components may be combined in any suitable vessel and at any suitable temperature for a time sufficient to form a mixture comprising the asymmetric derivative discussed in more detail below. Preferably, the reagent, aniline compound, and solvent are combined at a temperature of between about 20 degrees C. and 100 degrees C. If an alcohol is used as the solvent, the temperature may be the boiling point of the alcohol. Also, the reagent and aniline compound are combined in a nearly stoichiometric ratio—that is, the ratio of the molar amount of the reagent and the molar amount of the aniline compound is about 1.0, such as between about 0.8-1.2, including 0.9-1.1.

The combination or the reagent, the aniline compound, and the solvent results in the formation of a mixture, which comprises an asymmetric derivative having the formula

$A_nAr$—NH(COX')C=C(COY')NH—$ArB_n$            (III).

In formula III, which may also be referred to as a (2,3-bis-substituted anilino)-but-2-ene-1,4-dioic acid derivative, Ar, n, A, and B are as described above. X' and Y', which can be the same or different, represent —OH, —$O^-M^+$, —OR, —NHR, or —$NR_2$, wherein $M^+$ is a metal ion and R is independently a C1-C6 alkyl group. X' and Y' may be the same or different than X and Y of formula I for the reagent, described above. Thus, for example, X, Y, X' and Y' may be —OR, wherein R for each is the same, such as a methoxy group. Alternatively, X, Y, X' and Y' may be —OR, wherein R for X and Y is different from R for X' and Y'. For example, X' and Y' may be a methoxy group while X and Y are an alkoxy group other than methoxy. In this case, it is possible for the solvent and/or the conditions under which the components are combined to cause conversion of X and Y to X' and Y'.

The mixture may further comprise two symmetric derivatives having the formulas

$A_nAr$—NH(COX')C=C(COY')NH—$ArA_n$            (IVa), and

$B_nAr$—NH(COX')C=C(COY')NH—$ArB_n$            (IVb).

In formulas IVa and IVb, A, B, Ar, X', and Y' are as described above. Thus, the resulting mixture may comprise at least three derivatives—two symmetric derivatives and one asymmetric derivative.

Surprisingly, it has been found that the resulting mixture comprises the asymmetric derivative in an amount of greater than 50% by weight of the mixture. Typically, one skilled in the art would not expect that the amount of the asymmetric derivative would be this high. This is more readily illustrated for the embodiment in which the mixture further comprises two symmetric derivatives. One skilled in the art would expect that the mixture would comprise the three derivatives in a statistical distribution—that is, the molar ratio of asymmetric derivative III, symmetric derivative IVa, and symmetric derivative IVb would be expected to be approximately 2:1:1 due to the nature of the reaction and equilibration between products. Thus, the amount of asymmetric derivative III would be 50%, and, considering practical issues regarding product yield and recovery, 50% would represent a maximum. The actual amount would be expected to be less than 50% by weight. It has surprisingly been found that a mixture can be produced having a non-statistical distribution in which the amount of the asymmetric derivative predominates. Such a mixture has been found to have several advantages, including the formation of a yellow pigment comprising an asymmetric colorant in an amount of greater than 50% by weight of the pigment.

Thus, the method of the present invention results in the formation of a mixture comprising greater than 50% by weight of the asymmetric derivative. Preferably, the amount of the asymmetric derivative is greater than 60% and more preferably greater than 75% by weight of the mixture. Such a mixture has been found to have several advantages, including the formation of a yellow pigment comprising an asymmetric colorant in an amount of greater than 50%, preferably greater than 60%, and more preferably greater than 75% by weight of the pigment, described in more detail below.

In a preferred embodiment of the method of the present invention, the asymmetric derivative of the mixture comprises at least one methyl ester group. Thus, for this preferred embodiment, either X', Y', or, preferably, both X' and Y' are —OCH$_3$. It has surprisingly been found that the nature of the groups COX' and COY' in formula III has a strong effect on the composition of the resulting mixture.

For this preferred embodiment, a variety of methods may be used to produce the asymmetric derivative comprising at least one methyl ester group. For example, the reagent may comprise at least one methyl ester group—that is, X, Y, or, preferably, both X and Y of the reagent may be —OCH$_3$. Alternatively, the reagent may comprise at least one group that can be converted to a methyl ester group. Thus, X, Y, or, preferably, both X and Y of the reagent may be something other than —OCH$_3$ but are groups that, when combined with the aniline compound and the solvent, can be converted to an —OCH$_3$ group. For example, the aniline compound and the reagent may be combined in a solvent comprising methanol under conditions sufficient to convert the COX and/or COY groups of the reagent to methyl ester groups.

In another preferred embodiment of the method of the present invention, the asymmetric derivative of the mixture substantially precipitates from the solvent. Without wishing to be bound by theory, it is believed that, by precipitating from the solvent, the asymmetric derivative becomes unavailable for further reaction, including equilibration of products, and therefore enables the formation of a mixture having a non-statistical product distribution. For the embodiment in which the mixture further comprises symmetric derivatives, described in more detail above, preferably, either or both of the symmetric derivatives could be soluble in the solvent while only the asymmetric derivative is substantially insoluble.

For this preferred embodiment, precipitation of the asymmetric derivative may result from, for example, either the nature of the asymmetric derivative or the nature of the solvent. For example, the solvent may be chosen such that the asymmetric derivative is not soluble in the solvent. Any method known in the art can be used to determine an appropriate solvent. For example, a mixture of asymmetric derivative III and symmetric derivatives IVa and IVb may be prepared using any method, including the method of the present invention. This mixture can then be combined with a variety of solvents to determine a solvent in which the asymmetric derivative is not soluble. In addition, HPLC techniques may be used to determine product solubility. Other methods will be known to one skilled in the art. Alternatively, the asymmetric derivative may comprise at least one group that results in precipitation of the derivative. For example, if the asymmetric derivative comprises at least one methyl ester group, as described in more detail above, the material has been found to precipitate from methanol. Other combinations are also possible.

In another preferred embodiment of the method of the present invention, the aniline compound is added to a solution of the reagent in the solvent over a period of time sufficient to form the mixture comprising the asymmetric derivative in an amount greater than 50% by weight of the mixture. For example, the aniline compound can be added gradually over a period of about 120 minutes, preferably over 60 minutes, more preferably over 30 minutes, and most preferably from about 5 to about 20 minutes. Without wishing to be bound by theory, it is believed that the aniline compound and the reagent react very quickly and slowly equilibrate to the expected statistical distribution of products through reaction of excess aniline compound and the asymmetric derivative. A gradual addition of the aniline compound avoids formation of excess aniline which reduces the equilibration of products, thereby forming a mixture having a non-statistical distribution of derivatives.

For this preferred embodiment, the gradual addition method may be used in combination with either or both of the preferred embodiments described above. For example, the aniline compound may be added gradually to a solution of the reagent in a solvent to produce a mixture comprising an asymmetric derivative that substantially precipitates from the solvent. Furthermore, the aniline compound may be added to a solution of a reagent comprising at least one methyl ester group or a group that can be converted to a methyl ester group.

As described above, the method of the present invention comprises the step of combining a reagent having formula I, an aniline compound having formula II, and a solvent to produce a mixture comprising an asymmetric derivative having formula III. The method further comprises the step of converting this mixture to a yellow pigment comprising an asymmetric quinolonoquinolone. Preferably, the amount of the asymmetric derivative remains essentially unchanged upon conversion to the yellow pigment, and therefore, the asymmetric quinolonoquinolone is present in the yellow pigment in an amount greater than 50%, preferably greater than 60%, and more preferably greater than 75% by weight of the yellow pigment.

The mixture may be converted to the yellow pigment using any method known in the art. For example, the mixture may be combined in a high boiling solvent to form a quinolone derivative, which can then be converted with a strong acid, such as polyphosphoric acid, to the quinolonoquinolone. Other methods will be known to one skilled in the art.

Thus, the present invention further relates to a yellow pigment comprising at least one asymmetric quinolonoquinolone in an amount greater than 50% by weight of the pigment. The asymmetric quinolonoquinolone has the formula

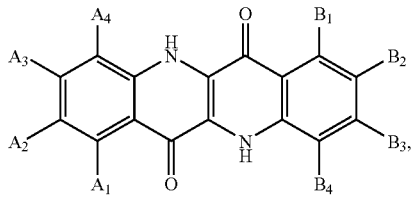

wherein $A^1$-$A^4$ and $B^1$-$B^4$ are substituents on the aromatic rings and can be any of those described for A and B above. At least one of $A^1$-$A^4$ is different from $B^1$-$B^4$, thereby making the quinolonoquinolone asymmetric. The yellow pigment may further comprise two symmetric quinolonoquinolones having the structure V, wherein $A^1$-$A^4$ are the same as $B^1$-$B^4$. Thus, the resulting yellow pigment may comprise at least three quinolonoquinolones—two symmetric derivatives and one asymmetric derivative.

In one embodiment, the asymmetric quinolonoquinolone has the formula

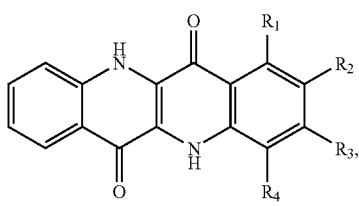

wherein each of $R^1$-$R^4$ can be any of the substituents described above for A or B. Preferably, at least one of $R^1$-$R^4$ is a halogen, and more preferably, one of $R^1$-$R^4$ is halogen. Thus, preferably, the yellow pigment is a monohaloquinolonoquinolone wherein one of $R^1$-$R^4$ is a halogen group and the rest are hydrogen. For example, $R^2$ can be a fluorine group, and each of $R^1$, $R^3$, and $R^4$ is a hydrogen. Also, $R^3$ can be a fluorine group, with the remaining substituents being hydrogen.

The yellow pigment can have a wide range of BET surface areas, as measured by nitrogen adsorption, depending on the desired properties of the yellow pigment. As is known to those skilled in the art, a higher surface area will correspond to a smaller particle size. If a higher surface area is not readily available for the desired application, it is also well recognized by those skilled in the art that the yellow pigment may be subjected to conventional size reduction or comminution techniques, such as ball or jet milling, to reduce the yellow pigment to a smaller particle size, if desired.

The present invention further relates to a modified yellow pigment comprising a yellow pigment having attached at least one organic group. The yellow pigment is the yellow of the present invention and therefore comprises at least one asymmetric quinolonoquinolone present in an amount of greater than 50% by weight of the yellow pigment. Preferably, the organic group comprises at least one ionic group, ionizable group, or a mixture thereof. An ionic group is either anionic or cationic and is associated with a counterion of the opposite charge including inorganic or organic counterions such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, and $Cl^-$, where R' represents hydrogen or an organic group such as a substituted or unsubstituted aryl and/or alkyl group. An ionizable group is one that is capable of forming an ionic group in the medium of use. Anionizable groups form anions and cationizable groups form cations. Preferably, the attached group is an organic group. Organic ionic groups include those described in U.S. Pat. No. 5,698,016, the description of which is fully incorporated herein by reference.

Anionic groups are negatively charged ionic groups that may be generated from groups having ionizable substituents that can form anions (anionizable groups), such as acidic substituents. They may also be the anion in the salts of ionizable substituents. Representative examples of anionic groups include —$COO^-$, —$SO_3^-$, —$OSO_3^-$, —$HPO_3^-$, —$OPO_3^{-2}$, and —$PO_3^{-2}$. Representative examples of anionizable groups include —COOH, —$SO_3H$, —$PO_3H_2$, —R'SH, —R'OH, and —$SO_2NHCOR'$, where R' represents hydrogen or an organic group such as a substituted or unsubstituted aryl and/or alkyl group. Preferably, the attached group comprises a carboxylic acid group, a sulfonic acid group, a sulfate group, a phosphonate group, or salts thereof. For example, the attached group may be an organic group such as a benzene carboxylic acid group, a benzene dicarboxylic acid group, a benzene tricarboxylic acid group, a benzene sulfonic acid group, or salts thereof. The attached organic group may also be a substituted derivative of any of these.

Cationic groups are positively charged organic ionic groups that may be generated from ionizable substituents that can form cations (cationizable groups), such as protonated amines. For example, alkyl or aryl amines may be protonated in acidic media to form ammonium groups —$NR'_2H^+$, where R' represent an organic group such as a substituted or unsubstituted aryl and/or alkyl group. Cationic groups may also be positively charged organic ionic groups. Examples include quaternary ammonium groups (—$NR'_3^+$) and quaternary phosphonium groups (—$PR'_3^+$). Here, R', which can be the same or different, represents hydrogen or an organic group such as a substituted or unsubstituted aryl and/or alkyl group. Preferably, the attached group comprises an alkyl amine group or a salt thereof or an alkyl ammonium group.

The organic group may also be a polymeric group. Preferably, the polymeric group comprises the ionic or ionizable groups described above. Thus, the organic group may be a polymeric group comprising one or more anionic or anionizable groups. Examples include, but are not limited to, polyacids such as polyacrylic acid, polymethacrylic acid, copolymers of acrylic acid or methacrylic acid, including styrene-acrylic acid polymers, and hydrolyzed derivatives of maleic anhydride-containing polymers. The organic group may also be a polymeric group comprising one or more cationic or cationizable groups. Examples include, but are not limited to, linear or branched polyamines such as polyethyleneimine (PEI), oligomers of ethyleneimine (such as pentaethyleneamine, PEA) and derivatives of polyethyleneimine. The organic group may also be a polymeric group comprising one or more naturally occurring polymers, such as proteins or carbohydrates.

The modified yellow pigment may be prepared using methods known to those skilled in the art such that organic chemical groups are attached to the pigment. This provides a more stable attachment of the groups onto the pigment compared to adsorbed groups, e.g., polymers, surfactants, and the like. For example, the modified pigments can be prepared using the methods described in U.S. Pat. Nos. 5,554,739, 5,707,432, 5,837,045, 5,851,280, 5,885,335, 5,895,522, 5,900,029, 5,922,118, and 6,042,643, and PCT Publication WO 99/23174, the descriptions of which are fully incorporated herein by reference. Such methods provide for a more stable attachment of the groups onto the pigment compared to dispersant type methods, which use, for example, polymers and/or surfactants.

Both the yellow pigments as well as the modified yellow pigments of the present invention may be used in a variety of different applications, including, for example, plastic compositions, aqueous inks, aqueous coatings, rubber compositions, paper compositions and textile compositions. In particular, these pigments may be used in aqueous compositions, including, for example, automotive and industrial coatings, paints, toners, adhesives, latexes, and inks. The pigments have been found to be most useful in ink composition, especially inkjet inks.

In general, an ink may consist of four basic components: (1) a colorant or pigment, (2) a vehicle or varnish which functions as a carrier during printing, (3) additives to improve printability drying, and the like, and (4) solvents to adjust viscosity, drying and the compatibility of the other ink components. For a general discussion on the properties, preparation and uses of aqueous inks, see "The Printing Manual", 5th Ed., Leach et al, Eds. (Chapman and Hall, 1993), incorporated herein by references. Various aqueous ink compositions are also disclosed, for example, in U.S. Pat. Nos. 2,833,736, 3,607,813, 4,104,833, 4,308,061, 4,770,706, and 5,026,755, all incorporated herein by reference.

The yellow pigments and modified yellow pigments of this invention are particularly useful in ink formulations. Thus, the present invention further relates to an ink composition comprising a liquid vehicle and either the yellow pigment or modified yellow pigment described above. Preferably, the ink composition is an aqueous ink composition, wherein the liquid vehicle comprises water. Other known aqueous ink additives may also be incorporated into the aqueous ink formulation.

The yellow pigments or modified yellow pigments of the present invention, either as predispersion or as a solid, can be incorporated into an aqueous ink formulation using standard techniques. Use of a water dispersible modified yellow pigment, described above, provides a significant advantage and cost savings by reducing or eliminating the milling steps generally used with other conventional pigments.

The yellow pigments and modified yellow pigments of this invention may also be used in coating compositions such as paints or finishes. Thus, the present invention further relates to a coating composition comprising a liquid vehicle, resin or binder, and either the yellow pigment or modified yellow pigment described above. Preferably, the coating composition is an aqueous coating composition, wherein the liquid vehicle comprises water. Other known aqueous coating additives may also be incorporated the aqueous coating composition, such as those described in, for example, McGraw-Hill Encyclopedia of Science & Technology, 5th Ed. (McGraw-Hill, 1982), incorporated herein by reference, as well as U.S. Pat. Nos. 5,051,464, 5,319,044, 5,204,404, 5,051,464, 4,692,481, 5,356,973, 5,314,945, 5,266,406, and 5,266,361, all incorporated herein by reference.

The yellow pigments or modified yellow pigments of the present invention, either as a predispersion or as a solid, can be incorporated into an aqueous coating composition using standard techniques. Use of a water dispersible modified yellow pigment, described above, provides a significant advantage and cost savings by reducing or eliminating the milling steps generally used with other conventional carbon blacks.

An ink or coating composition comprising the yellow pigments or modified yellow pigments of the present invention, including the preferred aqueous ink or coating compositions comprising an aqueous vehicle and stably dispersed yellow pigment or modified yellow pigment, can be formed with a minimum of components and processing steps when the above described pigments are used. Such an ink or coating may be used for a variety of uses. Preferably, in aqueous inks and coatings of the present invention, the yellow pigment and/or modified yellow pigment are present in an amount of less than or equal to 20% by weight of the ink or coating. It is also within the bounds of the present invention to use an aqueous ink or coating formulation containing a mixture of the yellow pigment of the present invention with the modified yellow pigment of the present invention. Furthermore, conventional yellow pigments can also be used in combination with the yellow pigment or modified yellow pigment of the present invention. Common additives may be added to the dispersion to further improve the properties of the aqueous ink or coating compositions.

Preferably the ink composition is an inkjet ink composition. Thus, the present invention further relates to an inkjet ink composition comprising a vehicle and a pigment. The vehicle can be either an aqueous or non-aqueous liquid vehicle, but is preferably a vehicle that contains water. Thus, the vehicle is preferably an aqueous vehicle, which is a vehicle that contains greater than 50% water and can be, for example, water or mixtures of water with water miscible solvents such as alcohols. Preferably the aqueous vehicle is water, and the inkjet ink composition is an aqueous inkjet ink composition.

The pigment can be any of the pigments described above. Thus, the inkjet ink composition of the present invention comprises either the yellow pigment of the present invention or the modified yellow pigment of the present invention. The pigment is present in the inkjet ink composition in an amount effective to provide the desired image quality (for example, optical density) without detrimentally affecting the performance of the inkjet ink. Typically, the pigment can be present in an amount ranging from about 0.1% to about 30% based on the weight of the ink. More or less pigment may be used depending on a variety of factors. For example, for the inkjet ink composition comprising the modified yellow pigment of the present invention, the amount of pigment may vary depending on the amount of attached organic group, particularly when the organic group is a polymeric group. It is also within the bounds of the present invention to use a mixture of pigments, including, for example, the modified yellow pigment described herein and unmodified pigments, other modified pigments, or both. Furthermore, it is also within the bounds of the present invention to use the yellow pigment or the modified yellow pigment of the present invention, which have been encapsulated by a polymer, including any of the polymers described herein.

The inkjet ink composition of the present invention can be formed with a minimum of additional components (additives and/or cosolvents) and processing steps. However, suitable additives may be incorporated in order to impart a number of desired properties while maintaining the stability of the compositions. For example, surfactants and/or dispersants, humectants, drying accelerators, penetrants, biocides, binders, and pH control agents, as well as other additives known in the art, may be added. The amount of a particular additive will vary depending on a variety of factors but generally ranges between 0% and 40%.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be in solid form or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Specific examples include, but are not limited to, commercial products such as Versa® 4, Versa® 7, and Versa® 77 (National Starch and Chemical Co.); Lomar® D (Diamond Shamrock Chemicals Co.); Daxad®19 and Daxad® K (W. R. Grace Co.); and Tamol® SN (Rohm & Haas). Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used, such as Igepal® CA and CO series materials (Rhone-Poulenc Co.) Briji® Series materials (ICI Americas, Inc.), and Triton® series materials (Union Carbide Company). These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols; polyvinylpyrrolidones; acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(metha)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-methylstyrene-(meth)acrylic acid copolymers, styrene-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol, 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cylcopropanol; amides such as dimethyl formaldehyde and dimethyl acetamide; ketones or ketoalcohols such as acetone and diacetone alcohol; ethers such as tetrahydrofurane and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidene; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

Various polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols, hydroxypropylenecellulose, hydroxyethylcellulose, polyvinylpyrrolidinone, polyvinylether, starch, polysaccharides, polyethyleneimines with or without being derivatized with ethylene oxide and propylene oxide including the Discole® series (DKS International); the Jeffamine® series (Texaco); and the like. Additional examples of water-soluble polymer compounds include various dispersants or surfactants described above, including, for example, styrene-acrylic acid copolymers, styrene-acrylic acid-alkyl acrylate terpolymers, styrene-methacrylic acid copolymers, styrene-maleic acid copolymers, styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers or may be a water dispersible polyurethane.

Various additives for controlling or regulating the pH of the inkjet ink composition of the present invention may also be used. Examples of suitable pH regulators include various amines such as diethanolamine and triethanolamine as well as various hydroxide reagents. An hydroxide reagent is any reagent that comprises an OH⁻ ion, such as a salt having an hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate OH⁻ ions in an aqueous medium. Examples include carbonates such as sodium carbonate, bicarbonates such as sodium bicarbonate, and alkoxides such as sodium methoxide and sodium ethoxide. Buffers may also be added.

Additionally, the inkjet ink composition of the present invention may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like.

The inkjet ink composition can be purified and/or classified using methods such as those described above for the modified pigments of the present invention. An optional counterion exchange step can also be used. In this way, unwanted impurities or undesirable large particles can be removed to produce an ink with good overall properties.

The present invention further relates to an inkjet ink set which comprises various inkjet ink compositions and includes the inkjet ink composition of the present invention. The inkjet ink compositions of this set may differ in any way known in the art. For example, the inkjet ink set may comprise inkjet ink compositions comprising different types and/or colors of pigments, including, for example, an inkjet ink composition comprising a cyan pigment, an inkjet ink composition comprising a magenta pigment, and/or an inkjet ink composition comprising a black pigment. Other types of inkjet ink compositions may also be used, including, for example, compositions comprising agents designed to fix the inkjet ink compositions onto the substrate. Other combinations will be known in the art.

The present invention will be further clarified by the following examples which are intended to be only exemplary in nature.

EXAMPLES

Examples 1-3

The following examples demonstrate an embodiment of the present invention in which an aniline having formula II is added to a solution of a reagent having formula I in a solvent over a period of time sufficient to form a mixture comprising an asymmetric derivative having formula III in an amount greater than 50% by weight of the mixture.

A) Preparation of the Reagent Having Formula I

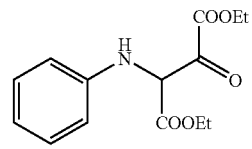

Diethyl anilinooxalate, the reagent used for these examples, was prepared as follows. In the absence of moisture, a 1 liter round bottom flask with a magnetic stirbar was charged with 42.8 g of solid sodium ethoxide and 490 mL of absolute ethyl alcohol. The mixture was stirred for 15-20 min until most of the sodium ethoxide dissolved. To this was added 81.6 g of diethyl oxalate and 100 g of N-phenylglycine ethyl ester, and the reaction mixture was stirred at room temperature for 20-22 hours. After evaporating to dryness on a rotary evaporator, 750 mL of water was added, and the water insoluble impurities were filtered off. The aqueous filtrate was extracted once with 350 mL of ethyl acetate, and then the water layer was acidified with 30 mL of glacial acetic acid. This resulted in the formation of diethyl anilinooxalate as an orange oil, which was separated from the acidic aqueous layer. The remaining acidic water layer was extracted with 75 mL of chloroform. The extract was combined with the main product, and the solvent was evaporated in vacuo, yielding diethyl anilinooxalate as an orange oil (109 g, 70% yield). This was used without further purification.

B) Preparation of the Mixture Comprising an Asymmetric Derivative

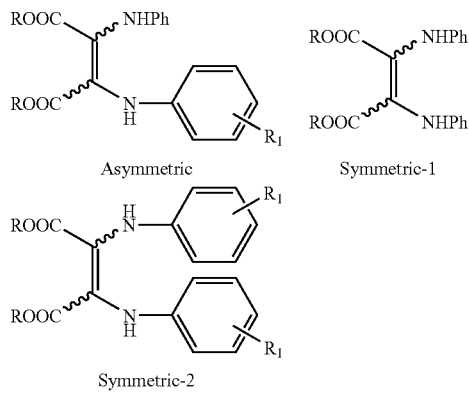

Asymmetric

Symmetric-1

Symmetric-2

The mixture of 2,3-bis-(anilino)-but-2-ene-1,4-dioic acid derivatives (R=ethyl) was prepared using the following general procedure. Specific reagents and results for each example are shown in Table 1 below.

In a round bottom flask, the diethyl anilinooxalate prepared as described above (0.105 mol) was mixed with 100 mL of absolute ethanol. Then, 3 drops of concentrated hydrochloric acid were added, and the reaction mixture was heated to reflux. At reflux, an aniline (0.106 mol) was added dropwise over 15 minutes, and the reaction mixture was refluxed for another 105 minutes, forming a mixture of 2,3-bis-(anilino)-but-2-ene-1,4-dioic acid derivatives comprising an asymmetric derivative and two symmetric derivatives. Thin layer chromatographic analysis showed the absence of the diethyl anilinooxalate reagent. The hot reaction mixture was homogeneous—no precipitation of product was observed. The reaction mixture was cooled to room temperature, and a precipitate formed, which was filtered, washed with ethanol, and dried in vacuo.

Table 1 below shows the distribution of products of the resulting mixture determined by HPLC (reverse phase column; water-MeCN gradient with 0.1% of trifluoroacetic acid). As the data shows, using an embodiment of the method of the present invention produces a mixture with a non-statistical distribution of asymmetric and symmetric products. There is considerable enrichment of the mixture with the asymmetric derivative (having the formula III) and much lower content of the symmetric derivatives (having the formulas IVa and IVb).

TABLE 1

| | | Product Distribution | | |
|---|---|---|---|---|
| Example | Aniline | Asymmetric | Symmetric-1 | Symmetric-2 |
| 1 | 4-Fluoroaniline ($R_1$ = 4-F) | 75.4% | 5.6% | 19.0% |
| 2 | 3-Fluoroaniline ($R_1$ = 3-F) | 66.9% | 12.1% | 21.0% |
| 3 | 3-Chloroaniline ($R_1$ = 4-Cl) | 65.9% | 13.6% | 20.5% |

HPLC analysis also showed the presence both Z- and E-stereoisomers for the asymmetric and symmetric derivatives. In all cases, the Z-isomer is the predominant stereoisomer, and the ratio of derivatives is the same for both stereoisomers.

Examples 4-6

The following examples demonstrate an embodiment of the present invention in which an aniline having formula II is added to a solution of a reagent having formula I in a solvent over a period of time sufficient to form a mixture comprising an asymmetric derivative having formula III in an amount greater than 50% by weight of the mixture. The asymmetric derivative comprises a methyl ester group.

A) Preparation of the Reagent

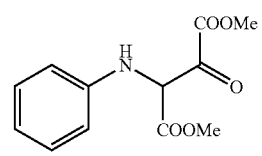

Dimethyl anilinooxalate, the reagent used for these examples, was prepared as follows. In the absence of moisture, a 1 liter round bottom flask with a magnetic stirbar was charged with 130 g of a 30% solution of sodium methoxide in methanol, 500 mL of absolute methanol, 80 g of dimethyl oxalate, and 120 g of N-phenylglycine ethyl ester. The mixture was stirred at room temperature for 20-22 hours. After evaporating to dryness on the rotary evaporator, 750 mL of water was added, and the water insoluble impurities were filtered off. The aqueous filtrate was extracted once with 300 mL of ethyl acetate, and then the water layer was acidified with 35 mL of glacial acetic acid. This resulted in the formation of dimethyl anilinooxalate as an orange oil, which was separated from the acidic aqueous layer. The remaining acid water layer was extracted with 75 mL of chloroform. The extract was combined with the main product and the solvent was evaporated in vacuo, yielding dimethyl anilinooxalate as an orange oil (111 g, 66% yield). Based on NMR data in DMSO, transesterification of the ethyl ester groups to methyl ester groups was nearly quantitative. Only 2-3% ethyl ester was found. This was used without further purification.

B) Preparation of the Mixture Comprising an Asymmetric Derivative

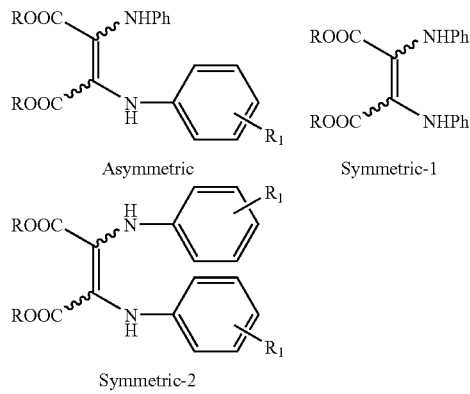

Asymmetric

Symmetric-1

Symmetric-2

The mixture of 2,3-bis-(anilino)-but-2-ene-1,4-dioic acid derivatives (R=methyl) was prepared using the following general procedure. Specific reagents and results for each example are shown in Table 2 below.

In a roundbottom flask, the dimethyl anilinooxalate prepared as described above (0.105 mol) was mixed with 100 ml of absolute methanol. Then, 3 drops of concentrated hydrochloric acid were added, and the reaction mixture was heated to reflux. At reflux, an aniline (0.106 mol) was added dropwise over 15 minutes, and the reaction mixture was refluxed for another 105 minutes, forming a mixture of 2,3-bis-(anilino)-but-2-ene-1,4-dioic acid derivatives comprising an asymmetric derivative and two symmetric derivatives. Product precipitation was observed almost immediately after all of the aniline was added. Thin layer chromatographic analysis showed the absence of the dimethyl anilinooxalate reagent. The hot reaction mixture was a thick slurry, with most of the product having precipitated. The reaction mixture was cooled to room temperature, and the precipitate was filtered, washed with methanol, and dried in vacuo.

Table 2 below shows the distribution of products of the resulting mixture determined by HPLC (reverse phase column; water-MeCN gradient with 0.1% of trifluoroacetic acid). As the data shows, using an embodiment of the method of the present invention produces a mixture with a non-statistical distribution of asymmetric and symmetric products. There is considerable enrichment of the mixture with the asymmetric derivative (having the formula III) and much lower content of the symmetric derivatives (having the formulas IVa and IVb). Furthermore, using a reagent comprising a methyl ester in combination with methanol as a solvent leads to an even greater enrichment of the mixture with the asymmetric derivative, compared to Examples 1-3.

TABLE 2

| | | Product Distribution | | |
|---|---|---|---|---|
| Example | Aniline | Asymmetric | Symmetric-1 | Symmetric-2 |
| 4 | 4-Fluoroaniline ($R_1$ = 4-F) | 90.3% | 5.4% | 4.3% |
| 5 | 3-Fluoroaniline ($R_1$ = 3-F) | 83.0% | 13.9% | 3.1% |
| 6 | 3-Chloroaniline ($R_1$ = 4-Cl) | 82.0% | 13.8% | 4.2% |

HPLC also shows the presence both Z- and E-stereoisomers for the asymmetric and symmetric derivatives. In all cases, the Z-isomer is the predominant stereoisomer, and the ratio of derivatives is the same for both stereoisomers.

Example 7

In one embodiment of the method of the present invention, the asymmetric derivative substantially precipitates from the solvent. The following examples provide one method for determining a solvent in which the asymmetric derivative would substantially precipitate.

The symmetric derivatives—Symmetric-1 and Symmetric-2—of the mixture of Examples 4-6 above were prepared using the following procedures.

A) Preparation of 2,3-bis-(anilino)-but-2-enedioic acid dimethyl ester (Symmetric-1 of Examples 4-6))

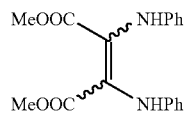

In a round bottom flask with a teflon stirbar, 25 g (142 mmol) of dimethyl dihydroxyfumarate (prepared according to a procedure described in U.S. Pat. No. 3,334,102), 29.0 g (312.5 mmol) of aniline, 0.1 mL of concentrated HCl, and 90 mL of methyl alcohol were mixed and heated to reflux for 3 hours. The reaction mixture was cooled to room temperature and left overnight in a refrigerator. The next morning, the resulting thick paste was filtered on a coarse frit, washed with a 50% (v:v) methanol-water mixture, and dried in a vacuum oven, yielding 30.1 g (65% yield) which, according to NMR analysis, was a mixture of E/Z isomers (E:Z~1:2).

B) Preparation of 2,3-bis-(4-fluoroanilino)-but-2-enedioic acid dimethyl ester (Symmetric-2 of Examples 4-6)

In a round bottom flask with a teflon stirbar, 25 g (142 mmol) of dimethyl dihydroxyfumarate (prepared according to a procedure described in U.S. Pat. No. 3,334,102), 34.7 g (312.5 mmol) of 4-fluoroaniline, 0.1 mL of concentrated HCl, and 90 ml of methyl alcohol were mixed and heated to reflux for 3 hours. The reaction mixture was cooled to room temperature and left overnight in a refrigerator. The next morning, the resulting thick paste was filtered on a coarse frit, washed with a 50% (v:v) methanol-water mixture, and dried in a vacuum oven, yielding 32.4 g (63% yield) which, according to NMR analysis, was a mixture of E/Z isomers (E:Z~1:2).

Since both symmetric derivatives resulting from the combination of the aniline and the reagent used in Examples 4-6 have very limited solubility in methanol, it would be expected that the resulting asymmetric derivative would also have limited solubility and therefore would substantially precipitate from this solvent.

Examples 8-10

The following examples demonstrate the effect of solubility on the distribution of asymmetric and symmetric derivatives in the mixture formed by the method of the present invention.

The symmetric derivatives of the mixture shown in Examples 4-6 above were prepared using the procedures described in Example 7 above. Then, various combinations of these derivatives were used to determine the extent of aniline exchange/randomization in a specific solvent. For Example 8, symmetric derivative 2,3-bis-(anilino)-but-2-enedioic acid dimethyl ester was combined with 4-fluoroaniline. For Example 9, symmetric derivative 2,3-bis-(4-fluoroanilino)-but-2-enedioic acid dimethyl ester was combined with aniline. For Example 10, these two symmetric derivatives were combined. For each example, the materials were combined in equimolar amounts in 5-fold (by weight) amount of methanol. Each combination was acidified by adding 3-5 drops of concentrated hydrochloric acid and then refluxed for 3 hour in order to produce reaction conditions similar to that of Examples 4-6.

For each of Example 8-10, the reaction mixtures were heterogeneous due to low solubility of the symmetric derivatives in methanol. After cooling to room temperature, the resulting precipitates were filtered, and the composition of the precipitates and filtrates were analyzed separately by HPLC (reverse phase column; water-MeCN gradient with 0.1% of trifluoroacetic acid). Results are summarized in the Table 3 below.

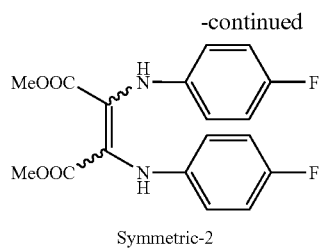

Symmetric-2

TABLE 3

| | Composition of products | | | | | |
|---|---|---|---|---|---|---|
| | Precipitate | | | Filtrate | | |
| Example | Symmetric-1 | Asymmetric | Symmetric-2 | Symmetric-1 | Asymmetric | Symmetric-2 |
| 8 | 93.4% | 4.4% | 2.2% | 19.1% | 35.0% | 46.0% |
| 9 | 4.7% | 9.0% | 86.3% | 24.3% | 37.0% | 38.7% |
| 10 | 43.7% | 11.1% | 45.2% | 22.2% | 37.9% | 39.9% |

HPLC also shows the presence both Z- and E-stereoisomers for the two symmetric derivatives. HPLC molecular response factors for these derivatives were found to be identical, and therefore an assumption was made that a) the response factor for the asymmetric derivative would be the same as for the corresponding symmetric derivatives, and b) the response factors for the Z- and E-isomers were identical.

As the data in Table 3 shows, disproportionation in the precipitates and formation of the corresponding asymmetric derivative is minimal for Examples 8-10 whereas in the filtrate the composition for each of these examples indicates a much larger extent of randomization. Therefore, the data shows the importance of the solubility of the derivatives. When either of the symmetric derivatives are soluble in the solvent, randomization occurs forming the asymmetric derivative in amounts approaching a statistical distribution. However, when either derivative is not soluble in the solvent, very little randomization occurs, and the mixture comprises a non-statistical distribution of products.

Thus, when a solvent in which either of the symmetric derivatives are insoluble is used, the asymmetric derivative would be expected to also be insoluble and, a non-statistical distribution of asymmetric and symmetric derivatives would be expected to be formed upon combining the aniline compound and reagent used to prepare these derivatives.

Example 11

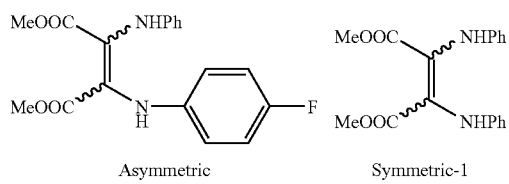

Asymmetric                Symmetric-1

This example demonstrates an embodiment of the method of the present invention in which a reagent having formula I, an aniline having formula II, and a solvent are combined to form a mixture comprising an asymmetric derivative having formula III, wherein the amount of the derivative is greater than 50% by weight of the mixture.

Into a 1 liter round bottom flask with a magnetic stirbar was added 113.4 g (0.63 mol) of a 30% solution of sodium methoxide in methanol followed by 290 mL of absolute methyl alcohol. The flask was then equipped with a condenser with a moisture protection tube, and 66.1 g (0.56 mol) of dimethyl oxalate and 100 g (0.56 mol) of N-phenylglycine ethyl ester was added. The reaction mixture was stirred at room temperature for 20-22 hours. After this time, 54 mL of concentrated hydrochloric acid (38% HCl; d=1.18; 0.66 mol HCl) was carefully added, along with 55.5 g (0.5 mol) of 4-fluoroaniline. Precipitation of product was observed almost immediately. The reaction mixture was heated at reflux for 6 hours and then cooled to room temperature. The resulting precipitate was filtered, washed with 50% methanol, and dried in a vacuum oven at 55 degrees C. overnight, yielding approximately 100-110 g of a mixture (approximately 40% overall yield based on N-phenylglycine ethyl ester) having the following composition: 3.5% of Symmetric-1, 83.0% of Asymmetric, and 13.5% of Symmetric-2 (determined by HPLC using a reverse phase column; water-MeCN gradient with 0.1% of trifluoroacetic acid). According to NMR analysis, each derivative is a mixture of E/Z isomers (E:Z~1:2). This material could be used without further purification for preparing a yellow pigment comprising an asymmetric quinolonoquinolone.

In a similar way, this procedure could be repeated using an equimolar amount (92.4 g, 0.56 mol) of N-phenylglycine methyl ester in place of N-phenylglycine ethyl ester. Within experimental error, the product yield and composition are the same.

Comparative Example 1

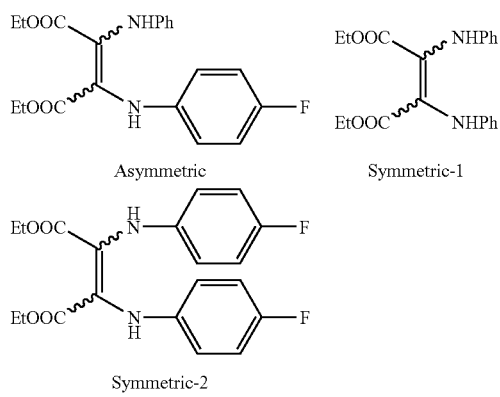

Into a 1 liter round bottom flask with magnetic stirbar was added 42.8 g (0.63 mol) of solid sodium ethoxide followed by 290 mL of absolute ethyl alcohol. The flask was then equipped with a condenser with a moisture protection tube, and the mixture was stirred for 15-20 minutes until most part of sodium ethoxide had dissolved. Then, 81.6 g (0.56 mol) of diethyl oxalate and 100 g (0.56 mol) of N-phenylglycine ethyl ester were added, and the reaction mixture was stirred at room temperature for 20-22 hours. After this time, 54 ML of concentrated hydrochloric acid (38% HCl; d=1.18; 0.66 mol HCl) was carefully added, along with 55.5 g (0.5 mol) of 4-fluoroaniline. The reaction mixture was heated at reflux for 6 hours and then cooled to room temperature. On cooling, precipitation of product began quickly, and the whole content of the flask solidified. The precipitate was filtered, washed with 50% ethanol, and dried in a vacuum oven at 55 degrees C. overnight, yielding approximately 110-120 g of a mixture (approximately 42% overall yield based on N-phenylglycine ethyl ester) having the following composition: 21.2% of Symmetric-1, 51.8% of Asymmetric, and 27.0% of Symmetric-2. According to NMR analysis, each derivative is a mixture of E/Z isomers (E:Z~1:2).

Thus, a mixture is prepared having the expected statistical mixture of products using a similar procedure to that of Example 11, however where the asymmetric derivative does not comprise a methyl ester and/or is not substantially soluble in the solvent (in this case, the solvent is not methanol). The material could be used without further purification for preparing a yellow pigment. However, it would be expected that the resulting product would not comprise an asymmetric quinolonoquinolone in an amount greater than 50% by weight of the pigment since the mixture does not comprise the asymmetric derivative in this amount.

Example 12-17

The following example demonstrates an embodiment of the method of the present invention in which a mixture, comprising an asymmetric derivative in an amount greater than 50% by weight of the mixture, is converted to a yellow pigment of the present invention. The following general two step procedure was used, which is similar to that shown in U.S. Pat. No. 3,334,102 and is shown in Scheme 1 below. The specific mixtures used for each example are shown in Table 4 below.

Cyclization Step 1

Approximately 1,000 mL of Dowtherm A (a euthectic mixture of 73.5% of phenyl ether and 26.5% biphenyl available from Dow Chemical Company) was heated to 120° C., and to this was added 100 g of the mixture of Example 1. The filtrate was kept hot during the next step.

Scheme 1

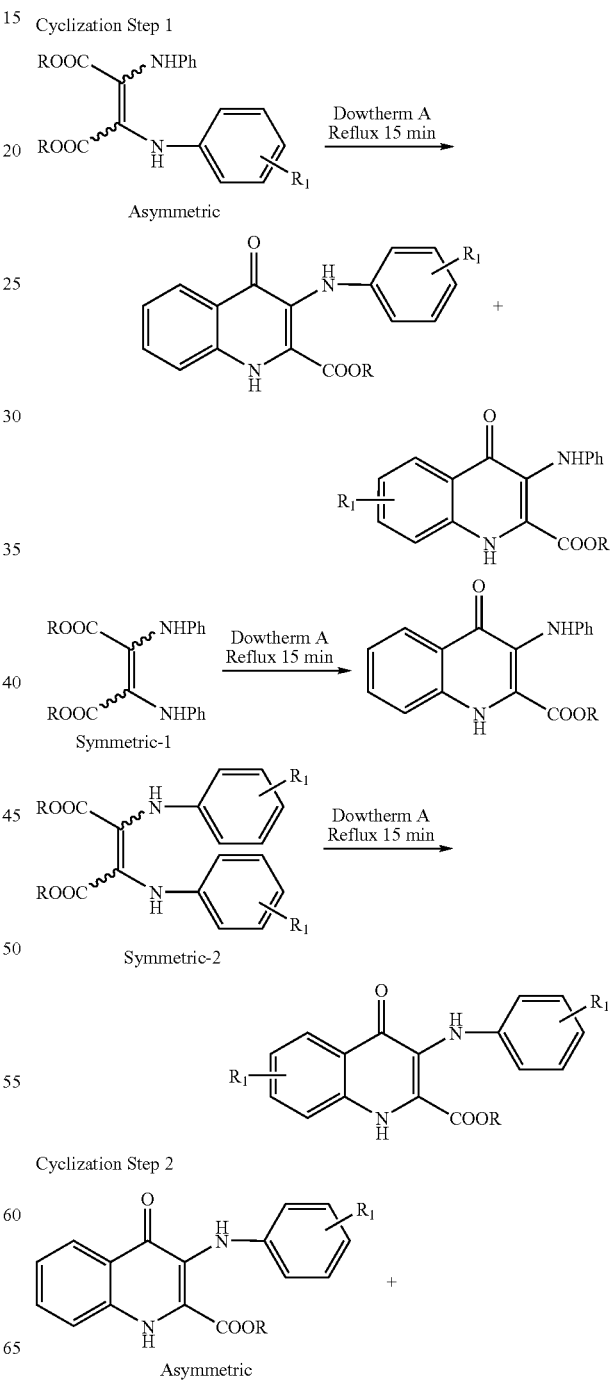

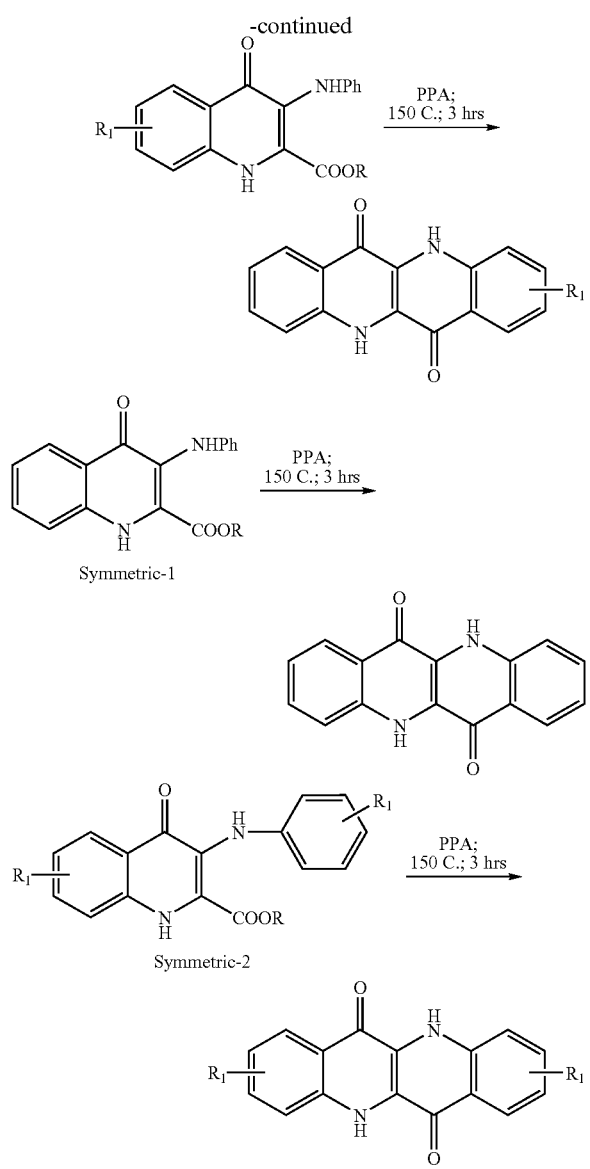

Symmetric-1

Symmetric-2

A 3 liter round bottom flask was equipped with a magnetic stirrer, heated jacket, addition funnel, and a short downward condenser to distill off volatile products. Into this flask was added 100 mL of Dowtherm A, and this was heated to reflux (255-265° C.). After reflux was reached, the hot filtered solution of the mixture of Example 1 was added from the heated funnel over 20-30 minutes, maintaining the reaction at reflux. Some Dowtherm A with ethanol distilled off during the reaction. After the addition was complete, the contents of the flask were heated at reflux for an additional 15 min, cooled to room temperature, and left overnight for crystallization. The resulting quinolone product was filtered, washed with petroleum ether, and dried in a vacuum oven, yielding the quinolones as mixtures of regioisomers. Yields are shown in Table 4 below.

According to HPLC analysis (reverse phase column; water-MeCN gradient with 0.1% of trifluoroacetic acid), no additional randomization was observed after the first cyclization step. Thus, the quinolone product composition correlated to the composition of the mixture. Cyclization Step 1 for an asymmetric derivative leads to a mixture (~1:1) of regioisomeric quinolones, which both cyclize in Step 2 (below) to form the same asymmetric quinolonoquinolone.

Cyclization Step 2

Five hundred grams of polyphosphoric acid were placed into a 750 mL, 5-neck sulfuration flask equipped with ankor stirrer, a thermocouple, and a Drierite tube. The acid was heated to 110° C. with stirring, and to this was added 60 g of the quinolone over 10-15 minutes, so that the material being added was wetted with polyphosphoric acid evenly. After the addition was complete, the temperature was raised to 150° C., and stirring was continued for 3 hours at this temperature. The reaction mixture was cooled to 80-90° C. and poured into 2.5 liters of cold tap water. Hydrolysis of the red polyphosphoric acid complex of the desired quinolonoquinolone began immediately, forming a bright yellow precipitate of pigment. The pigment was filtered using #2 filter paper and washed with plenty of DI water until the pH of filtrate was 5-6, yielding the yellow pigment of the present invention in nearly quantitative yield, as shown in Table 4 below.

TABLE 4

| Example | Mixture Example | Step 1 Yield | Step 2 Yield | Resulting Quinolonoquinolone - Major Product |
|---|---|---|---|---|
| 12 | Example 1 | 65% | 100% | 2-Fluoro |
| 13 | Example 2 | 63% | 100% | 3-Fluoro |
| 14 | Example 3 | 65% | 100% | 3-Chloro |
| 15 | Example 4 | 68% | 100% | 2-Fluoro |
| 16 | Example 5 | 65% | 100% | 3-Fluoro |
| 17 | Example 6 | 69% | 100% | 3-Chloro |

Since the quinolone composition correlated with the composition of the mixture used to prepare it, and since no further randomization is possible in the second cyclization step, the composition of the resulting yellow pigment would therefore correlate to the composition of the mixture used. This was confirmed by $^{19}$F-NMR in sulfuric acid for corresponding fluorinated quinolonoquinolones (for the products of Examples 12, 13, 15, 16). Thus, the yellow pigments comprise an asymmetric quinolonoquinolone in an amount greater than 50% by weight of the Pigment.

Example 18 the following example shows the preparation of a modified yellow pigment of the present invention comprising a yellow pigment having attached at least one organic group. For this example, the yellow pigment of Example 12 was used.

A rotor-stator high shear mixer (Silverson L4RT-A) was fitted with a 2 liter stainless steel beaker mounted on a hot plate. Approximately 55 g of the 2-fluoroquinolonoquinolone of Example 12 was added to the beaker, along with 13.32 g of sulfanilic acid (242 mmol) followed by 1 liter of DI water. The mixture was homogenized for 15 min at 7,200 rpm while heating to 65-70° C. When the mixture reached this temperature, a solution of 16.9 g (245 mmol) of sodium nitrite in 100 mL water was added dropwise over 20 minutes. The reaction mixture was then stirred at 7,200 rpm for 90 minutes at 65-70° C. After this time, the mixture was allowed to cool to room temperature.

The modified pigment dispersion was found to have a mean particle size of 350 nm (measured using a Microtrac UPA 150). It was then sonicated using a Misonix immersed sonicator for 2 hours, which further reduced the mean particle size to 150-200 nm. The resulting modified yellow pigment dispersion was diafiltered using a 50 nm diafiltration membrane column and concentrated to a solids content of 8-9%. This was then centrifuged for 30 minutes at 5,000 rpm, and the solids level was adjusted to 10% by diafiltration. The final modified yellow pigment dispersion was found to be stable both at room temperature as well as at elevated temperatures (60-70° C.) for many weeks, not only in an aqueous medium but also in presence of 10% by weight organic solvents, such as isopropanol, N-methylpyrrolidone, and 2-pyrrolidone. This indicated that the modified yellow pigment could be used to form an inkjet ink composition.

Therefore, an inkjet ink composition of the present invention was prepared using the formulation shown in Table 5 below using this modified yellow pigment of the present invention.

TABLE 5

| Ingredient | Amount |
| --- | --- |
| 2-pyrrolidinone | 7% |
| 1,5-pentanediol | 7% |
| trimethylolpropane | 5% |
| Surfynol 465 | 0.2% |
| pigment | 4% |
| water | 76.8% |

The resulting inkjet inks were printed using Canon I-550 printer on both plain papers (Xerox 4024 Printing Paper, Hammermill Copy Plus, Great White Paper, HP Advanced Paper) and photo papers (Epson Premium Glossy Photo Paper and HP Premium Plus Photo Paper) to produce highly saturated lightfast yellow prints having excellent overall print and color properties. In all cases reliable operation of the printer was observed, indicating that the inkjet ink compositions were stable during printing. Furthermore, since the yellow pigment of Example 12 comprised 75.4% by weight of the asymmetric derivative, 2-fluoroquinolonoquinolone (i.e., a non-statistical distribution of derivatives), it would be expected that the modified yellow pigment would have improved performance properties compared to an inkjet ink composition comprising a modified yellow pigment prepared from a yellow pigment having a statistical distribution of derivatives.

Examples 19

The following example describes the use of a modified yellow pigment of the present invention in an aqueous ink composition.

Ink Composition A could be prepared by adding 3.13 g parts of the dried and ground modified yellow pigment dispersion of Example 18 to a vehicle made by mixing 2.92 parts JONCRYL 61LV resin (available from S.C. Johnson Polymer), 0.21 parts isopropanol, 0.31 parts ARROWFLEX defoamer (available from Witco), 7.29 parts JONCRYL 89 resin (available from S.C. Johnson Polymer) and 6.98 parts water, and shaking the composition for 10 minutes on a paint shaker.

Ink Composition B could be prepared by grinding a mixture of 120 parts of the dried and ground modified yellow pigment dispersion of Example 18, 112 parts of JONCRYL 61LV resin (available from S.C. Johnson Polymer), 8 parts of isopropanol, 4 parts of ARROWFLEX defoamer (available from Witco), 156 parts of water and 400 g of grinding media. In order to check the grind level, samples could periodically be let down to Ink Composition C that contained 15.0 parts modified yellow pigment, 14.0 parts JONCRYL 61LV resin, 1.0 parts isopropanol, 1.7 parts ARROWFLEX defoamer, 35.1 parts Joncryl 89 and 33.4 parts water.

It would be expected that ink compositions A and C would show clean saturated shades of yellow with medium to high gloss when applied to paper. In addition, if similar ink compositions were prepared using the yellow pigment of Example 12 (from which the modified yellow pigment of Example 18 was prepared), similar results would be expected.

Example 20

The following example describes the use of a modified yellow pigment of the present invention in an aqueous coating composition.

Coating Composition A could be prepared by stirring 4.3 g of the modified yellow pigment dispersion of Example 18 into a mixture of 7.93 g of CARGILL 17-7240 acrylic resin (available from Cargill, Inc.), 0.80 g of dimethylethanolamine (DMEA), 19.57 g water, 0.37 g SURFYNOL CT136 surfactant (available from Air Products and Chemicals, Inc.), 1.32 g CARGILL 23-2347 melamine resin (available from Cargill, Inc.), 0.53 g ethylene glycol monobutyl ether and 0.075 g BYK-306 surfactant (available from BYK-Chemie USA).

By coating glossy lenetta paper with Coating Composition A, followed by drying at 350° F. for 10 minutes, and the applying a clear coat, followed by additional drying, it would be expected that the resulting paper coated with Coating Composition A would have Hunter L*, a*, b* values of 89.2, 120.1 and 2.2 and gloss of 56 at 60 degree angle. In addition, if a similar coating composition was prepared using the yellow pigment of Example 12 (from which the modified yellow pigment of Example 18 was prepared), similar results would be expected.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of preparing a yellow pigment comprising the steps of:
  a) combining, in any order,
    i) a reagent having the formula $A_n Ar\text{---}NH\text{---}CH(COX)\text{---}CO\text{---}COY$ (I), ii) an aniline compound having the formula $B_n Ar\text{---}NH_2$ (II), and
    iii) a solvent
to form a mixture comprising an asymmetric derivative having the formula $A_n Ar\text{---}NH(COX')C\text{=}C(COY')NH\text{---}ArB_n$ (III);

and
  b) converting the mixture to the yellow pigment,
    wherein Ar is an aromatic group; n is 0-4; A, which can be the same or different when n is greater than 1, is a substituent on the aromatic group; B, which can be the same or different when n is greater than 1, is a substituent on the aromatic group wherein $A_n$Ar and $B_n$Ar are different; X, X', Y, and Y', which can be the same or different, represent —OH, —O⁻M⁺, —OR, —NHR, or —NR₂, wherein M⁺ is a metal ion and R is independently a C1-C6 alkyl group; and wherein the yellow pigment comprises an asymmetric quinolonoquinolone in an amount greater than 50% by weight of the yellow pigment.

2. The method of claim 1, wherein the mixture comprises the asymmetric derivative in an amount greater than 50% by weight of the mixture.

3. The method of claim 1, wherein the asymmetric derivative substantially precipitates from the solvent.

4. The method of claim 1, wherein X', Y', or both X' and Y' are —OCH₃.

5. The method of claim 3, wherein, in step a), the aniline is added to a solution of the reagent in the solvent over a period of time sufficient to form the mixture comprising the asymmetric derivative in an amount greater than 50% by weight of the mixture.

6. The method of claim 4, wherein, in step a), the aniline is added to a solution of the reagent in the solvent over a period of time sufficient to form the mixture comprising the asymmetric derivative in an amount greater than 50% by weight of the mixture.

7. The method of claim 4, wherein X, Y, or both X and Y are not —OCH₃.

8. The method of claim 7, wherein the solvent comprises methanol.

9. A method of preparing a mixture of (2,3-bis-substituted anilino)-but-2-ene-1,4-dioc acid derivatives comprising the step of combining, in any order,
i) a reagent having the formula

  (I), ii) an aniline compound having the formula

  (II), and
iii) a solvent to form a mixture of (2,3-bis-substituted anilino)-but-2-ene-1,4-dioc acid derivatives comprising an asymmetric derivative having the formula

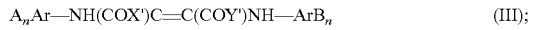  (III);

wherein Ar is an aromatic group; n is 0-4; A, which can be the same or different when n is greater than 1, is a substituent on the aromatic group; B, which can be the same or different when n is greater than 1, is a substituent on the aromatic group wherein $A_n$Ar and $B_n$Ar are different; X, X', Y, and Y', which can be the same or different, represent —OH, —O⁻M⁺, —OR, —NHR, or —NR₂, wherein M⁺ is a metal ion and R is independently a C1-C6 alkyl group; and wherein the mixture comprises the asymmetric derivative in an amount greater than 50% by weight of the mixture.

10. The method of claim 9, wherein the asymmetric derivative substantially precipitates from the solvent.

11. The method of claim 9, wherein X', Y', or both X' and Y' are —OCH₃.

12. The method of claim 10, wherein, in step a), the aniline is added to a solution of the reagent in the solvent over a period of time sufficient to form the mixture comprising the asymmetric derivative in an amount greater than 50% by weight of the mixture.

13. The method of claim 11, wherein, in step a), the aniline is added to a solution of the reagent in the solvent over a period of time sufficient to form the mixture comprising the asymmetric derivative in an amount greater than 50% by weight of the mixture.

14. The method of claim 11, wherein X, Y, or both X and Y are not —OCH₃.

15. The method of claim 14, wherein the solvent comprises methanol.

16. A method of preparing a yellow pigment comprising the step of converting a mixture of (2,3-bis-substituted anilino)-but-2-ene-1,4-dioc acid derivatives comprising an asymmetric derivative having the formula

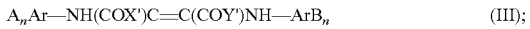  (III);

to the yellow pigment,
wherein Ar is an aromatic group; n is 0-4; A, which can be the same or different when n is greater than 1, is a substituent on the aromatic group; B, which can be the same or different when n is greater than 1, is a substituent on the aromatic group wherein $A_n$Ar and $B_n$Ar are different; X' and Y', which can be the same or different, represent —OH, —O⁻M⁺, —OR, —NHR, or —NR₂, wherein M⁺ is a metal ion and R is independently a C1-C6 alkyl group; and wherein the yellow pigment comprises an asymmetric quinolonoquinolone in an amount greater than 50% by weight of the yellow pigment.

17. The method of claim 16, wherein the mixture comprises the asymmetric derivative in an amount greater than 50% by weight of the mixture.

18. The method of claim 16, wherein X', Y', or both X' and Y' are —OCH₃.

\* \* \* \* \*